US 6,594,578 B2

(12) United States Patent
Lai

(10) Patent No.: US 6,594,578 B2
(45) Date of Patent: Jul. 15, 2003

(54) DETECTION AND REMOVAL OF SELF-ALERTS IN A TRACKING SYSTEM

(75) Inventor: Chih Lai, Woodbury, MN (US)

(73) Assignee: United Parcel Service of America, Atlanta, GA (US)

( * ) Notice: Subject to any disclaimer, the term of this patent is extended or adjusted under 35 U.S.C. 154(b) by 0 days.

(21) Appl. No.: 09/892,597

(22) Filed: Jun. 27, 2001

(65) Prior Publication Data

US 2002/0004698 A1 Jan. 10, 2002

Related U.S. Application Data

(60) Provisional application No. 60/217,245, filed on Jul. 10, 2000.

(51) Int. Cl.[7] ............................ G06F 19/00; G01S 13/00
(52) U.S. Cl. .............................................. 701/120; 342/63
(58) Field of Search ................................. 701/1, 3–4, 9, 701/14–16, 23–27, 120–122; 342/29, 36–37, 40, 63, 65, 89, 93, 95, 113–114, 90

(56) References Cited

U.S. PATENT DOCUMENTS

| 4,746,924 A | | 5/1988 | Lightfoot |
| 4,951,056 A | | 8/1990 | Cope et al. |
| 5,208,591 A | | 5/1993 | Ybarra et al. |
| 5,308,022 A | * | 5/1994 | Cronkhite et al. ........... 244/190 |
| 5,317,316 A | | 5/1994 | Sturm et al. |
| 5,477,225 A | * | 12/1995 | Young et al. ................. 342/32 |
| 5,604,504 A | | 2/1997 | Nail |
| 5,995,038 A | | 11/1999 | Ikizyan |
| 6,002,347 A | * | 12/1999 | Daly et al. ................... 340/945 |

FOREIGN PATENT DOCUMENTS

EP    0 411 309 A    2/1991

OTHER PUBLICATIONS

PCT Notification of Transmittal of the International Search Report for International Application No. PCT/US01/21618, filed Jul. 10, 2001 (two (2) references); Search Report mailed Jul. 4, 2002.

* cited by examiner

Primary Examiner—Thu Nguyen
(74) Attorney, Agent, or Firm—Alston & Bird LLP

(57) ABSTRACT

Improved methods and systems for detecting self-alerts from upload messages in a TIS system to thereby eliminate the likelihood of TIS self-alerts appearing on CDTI displays. The present invention determines whether a self-alert was present in a previous traffic information uplink to determine whether a target in a current information uplink is real. Using a weighting algorithm, typically a fuzzy logic algorithm, a system in accordance with the present invention can distinguish between targets in consecutive radar sweeps to identify self-alerts. If the self-alert was not present in previous uplinks, then the system removes the self-alert from subsequent views on the CDTI. Thus, the present invention provides an improved visual display system for pilots and air traffic controllers.

30 Claims, 6 Drawing Sheets

DETECTION AND REMOVAL OF SELF-ALERTS IN A TRACKING SYSTEM

CROSS-REFERENCE TO RELATED APPLICATIONS

The present application claims priority from U.S. Provisional Patent Application Ser. No. 60/217,245, entitled "Detection and Removal of TIS Self-Alerts", filed on Jul. 10, 2000, the contents of which are herein incorporated by reference.

FIELD OF THE INVENTION

The invention relates to methods and systems for detecting and removing self-alerts in a tracking system and, more specifically, methods and systems for detecting and removing self alerts, i.e., targets representing one's own aircraft, in an air-to-ground tracking system.

BACKGROUND OF THE INVENTION

TIS (Traffic Information Service) is a technology in which air traffic control Secondary Surveillance Radar (SSR) on the ground transmits traffic information about nearby aircraft to any suitably equipped aircraft within the SSR range. The transmissions are addressed to a particular aircraft, and are sent together with altitude or identity interrogations. In turn, the aircraft to which the transmissions are addressed receives such and displays to the pilot information about nearby aircraft that are being interrogated by the SSR.

Due to numerous reasons (e.g., signal reflection, fly in-out TIS coverage area, deflected Mode Stamp orders) the ground station may misinterpret the responses from interrogations. As a result, the ground station may misinterpret the addressed aircraft as another aircraft and uplink a false alert (i.e., a self-alert). Thus, it is desirable in TIS systems to be able to efficiently distinguish uplinked information identifying one's own aircraft (a TIS self-alert) from information identifying a distinct target that may pose a threat of mid-air collision. TIS self-alerts are undesirable because they can distract a pilot's attention from real threats or disturb essential flight operation (e.g., taking off or landing).

As is known by those of ordinary skill in the art, each TIS message or broadcast that is sent from the ground radar station will typically include the following information for each nearby aircraft (target):

1. Traffic Bearing defined as the angle from the ownship to the target aircraft with respect to the ownship track over the ground, quantized in about 6-degree increments.
2. Range defined as the distance between the ownship and the target aircraft, quantized in about 0.125-nm (nautical mile) increments.
3. Relative Altitude defined as the difference in altitude between the target aircraft and the ownship, quantized in about 100-foot increments. A positive value indicates that the aircraft is above ownship, while a negative value indicates that the aircraft is below the ownship.
4. Altitude Rate is an indicator of whether the target aircraft is climbing (value of 1) or descending (value of 2) faster than 500 feet per minute or in level flight (value 3).
5. Track is defined as the ground track angle of the target aircraft quantized to 45-degree increments.

Based empirically on flight test data, TIS self-alerts can generally be defined as those TIS targets having; (a) range less than 0.125 (⅛) nm from ownship and (b) relative altitude of less than 200 feet. Thus, a simplified approach would be to identify as a self-alert any TIS target that satisfies the above conditions (i.e., the self-alert conditions) and properly filter out the TIS self-alert so that it would not appear on the CDTI (Cockpit Display of Traffic Information) in the aircraft's cockpit. However, this approach would be unacceptable because it would not adequately address for example; (1) a TIS self alert that occasionally falls outside of the self-alert conditions, or (2) a real TIS target disappearing from the CDTI when it gradually flies into the self-alert conditions. Hence, while enlarging the self-alert conditions would solve (1) it would, conversely, heighten the problems related to (2).

A basic assumption can be made that a TIS self-alert must have its track very close to the ownship track since, by definition, a TIS self-alert is a reflection of ownship. Using this assumption, it would be possible to construct a TIS self-alert filtering scheme that provides for enlarged self-alert conditions (e.g., (a) range less than 0.875 nm from ownship and (b) relative altitude of less than 500 feet) and has TIS self-alert track close to the ownship track. This method of TIS detection will be referred to herein as a simple filtering algorithm.

However, this type of TIS self-alert filtering scheme would create an additional drawback; (3) a TIS target that flies in formation with the ownship will be misidentified as a self-alert and hence, will be filtered out. To rectify this situation, the self-alert conditions are further extended (e.g., (a) range less than 1.625 nm from ownship and (b) relative altitude of less than 1000 feet). In addition, when a TIS target is within these extended self-alert conditions, the TIS target will be preserved (i.e., not deemed a self-alert), if at least one TIS target has appeared in the extended conditions in the previous TIS upload message. This type of extended condition filtering also addresses drawback (2) related to a real TIS target disappearing from the CDTI when it gradually flies into the self-alert conditions.

However, even in the extended condition filtering scheme scenario, various problems present themselves that lead to TIS self-alert inaccuracies. For instance, in certain states the ownship track will jump significantly between consecutive TIS upload messages. Additionally, in certain states the tracks of the TIS self-alert will jump significantly between consecutive TIS upload messages. The simple filtering schemes and the extended condition filtering schemes discussed above do not take into account these significant changes in tracks between consecutive TIS messages. This drawback affects the ability of the filtering scheme to associate a TIS self-alert with ownship.

Another example of the inaccuracies presented by the previously discussed filtering schemes is that in certain states the altitude of the TIS self-alert will jump significantly (about 1000 feet) or becomes unknown between consecutive TIS upload messages. In this situation the above-discussed filtering schemes would be disabled from checking if a TIS target is within the self-alert conditions. Once the filtering scheme is disabled, a TIS self-alert would appear on the CDTI and, in turn, disablement would cause all other self-alerts included in the next consecutive upload message to appear on the CDTI. In a similar regard, a TIS self-alert will be undetected if one real TIS target were to appear in the extended conditions of the previous TIS message.

Thus, an unsatisfied need exists for an efficient and reliable method for detecting and removing TIS self-alerts. The desired detection and removal method and system should provide advanced TIS target correlation between two consecutive TIS upload messages. In addition, improved systems and methods for detecting and removing TIS self-alerts should provide a more flexible mechanism to minimize the impacts of TIS unstableness.

SUMMARY OF THE INVENTION

The present invention is an improvement in detecting TIS self-alerts from TIS upload messages to thereby eliminate the likelihood of TIS self-alerts appearing on CDTI displays. The present invention determines whether a self-alert was present in a previous traffic information uplink to determine whether a target in a current information uplink is real. Using a weighting algorithm, typically a fuzzy logic algorithm, a system in accordance with the present invention can distinguish between targets in consecutive radar sweeps to identify self-alerts. If the self-alert was not present in previous uplinks, then the system removes the self-alert from subsequent views on the CDTI. Thus, the present invention provides an improved visual display system for pilots and air traffic controllers. The invention also provides a more accurate visual display for pilots and air traffic controllers tracking actual targets in the vicinity of an airborne aircraft.

In accordance with an aspect of the invention, a weighted sum of the changes between traffic range, traffic track, relative altitude, and altitude rate in consecutive TIS messages for a target that may be a self-alert is determined. It has been determined empirically, through flight-test data, that the changes between consecutive range and track reports of a real TIS target are more stable than the relative altitude and altitude rate reports for the same real target. Thus, the weight applied to the delta range and delta track is higher than the weight applied to the delta relative altitude and delta altitude rate. If the weighted sum is less than a threshold, then two TIS targets from consecutive uploaded messages are determined to be associated (i.e. an actual legitimate target). If a TIS target appears within the pre-defined TIS self-alert cylinder and is not associated with any TIS target in a previous message, the TIS target is identified as a self-alert and is filtered so that it does appear on the CDTI.

In a preferred embodiment, the system according to the invention applies particular weights based on empirical flight-testing. The delta range and delta track values are weighted by the factor 0.1, while the delta relative altitude and delta altitude rate are weighted by the factor 0.07, and the threshold is set to 0.74. If the total weighted sum is less than the threshold, then the two TIS targets from consecutive uplinked messages are associated. If a TIS target appears within the pre-defined TIS self-alert conditions and is not associated with any previous TIS target from the other uplinked message, then the TIS target is identified as a self-alert and is filtered out.

DETAILED DESCRIPTION OF THE INVENTION

The present invention now will be described more fully hereinafter. This invention may, however, be embodied in many different forms and should not be construed as limited to the embodiments set forth herein; rather, these embodiments are provided so that this disclosure will be thorough and complete, and will fully convey the scope of the invention to those skilled in the art.

In accordance with the present invention, methods and systems for detecting TIS self-alerts to thereby eliminate the likelihood of TIS self-alerts appearing on CDTI displays, are provided for herein. The methods and systems provide for an association algorithm that weights the differences between the target attributes in consecutive TIS upload messages to determine whether the message includes a TIS self alert. In one embodiment of the invention, the association algorithm implements fuzzy logic (i.e., a probability model), more specifically a weighting algorithm, to determine the likelihood of TIS self-alerts.

Figure 1:
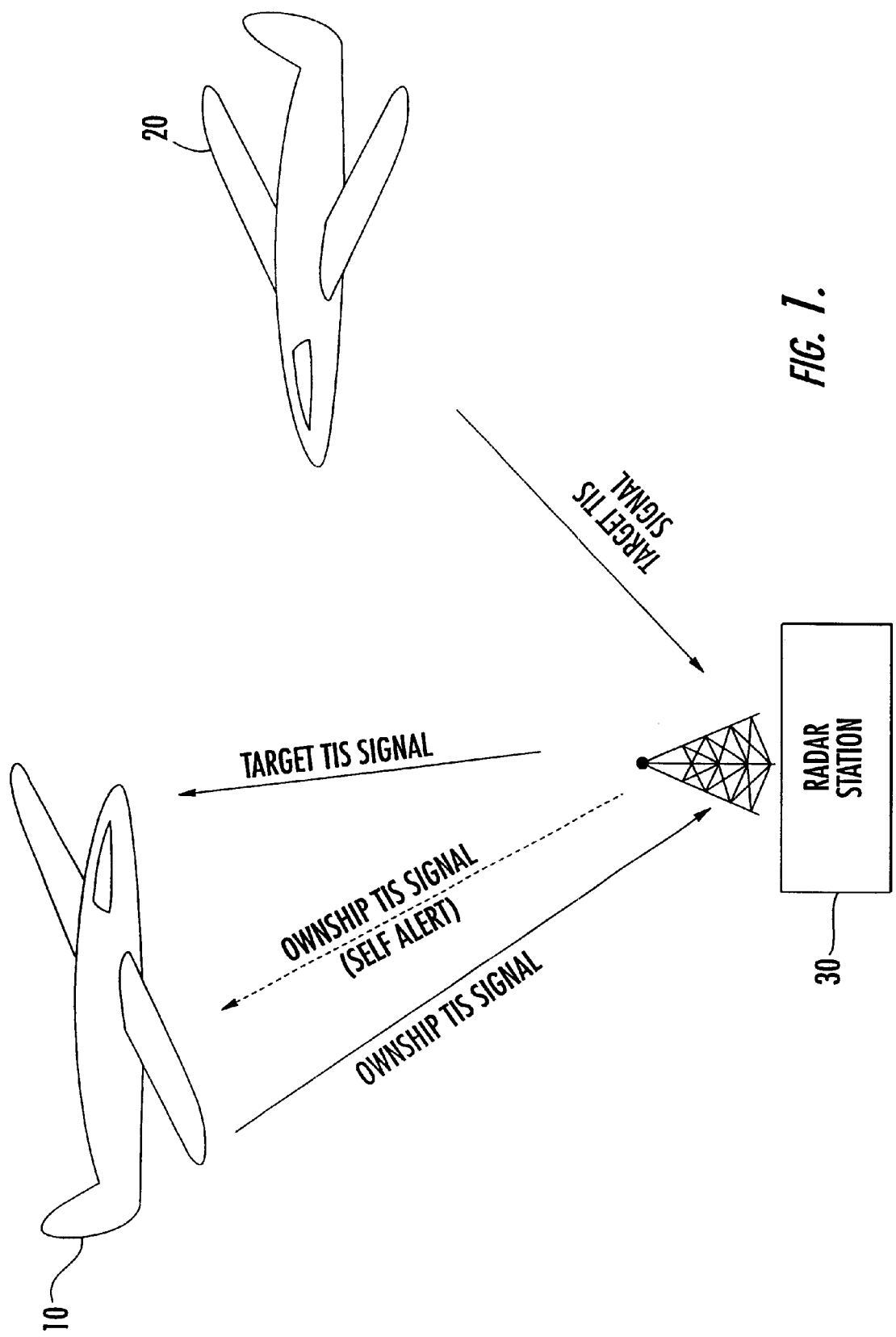
FIG. 1 is a schematic illustration of aircraft communication in a TIS system, in accordance with an embodiment of the present invention.

FIG. 1 is a schematic diagram of a simplified TIS system. The ownship 10 receives TIS messages that include pertinent data about other targets in the general vicinity of the ownship. Once the ownship receives the TIS message, the target data within the message is displayed on a CDTI terminal in the cockpit as a means of providing the crew within the ownship with accurate positional data of surrounding targets, like target 20. Data pertaining to surrounding targets is compiled and uploaded to the ownship by ground radar station 30. In this regard, the TIS upload message that the ownship receives may, or may not, include information related to the ownship. However, if the TIS upload does include information related to the ownship, then, the ownship must be able to distinguish this information as a "self-alert" as opposed to an actual target. Once a target within the TIS upload message is distinguished as a self-alert, it is filtered so that it is not rendered on the CDTI.

Figure 2:
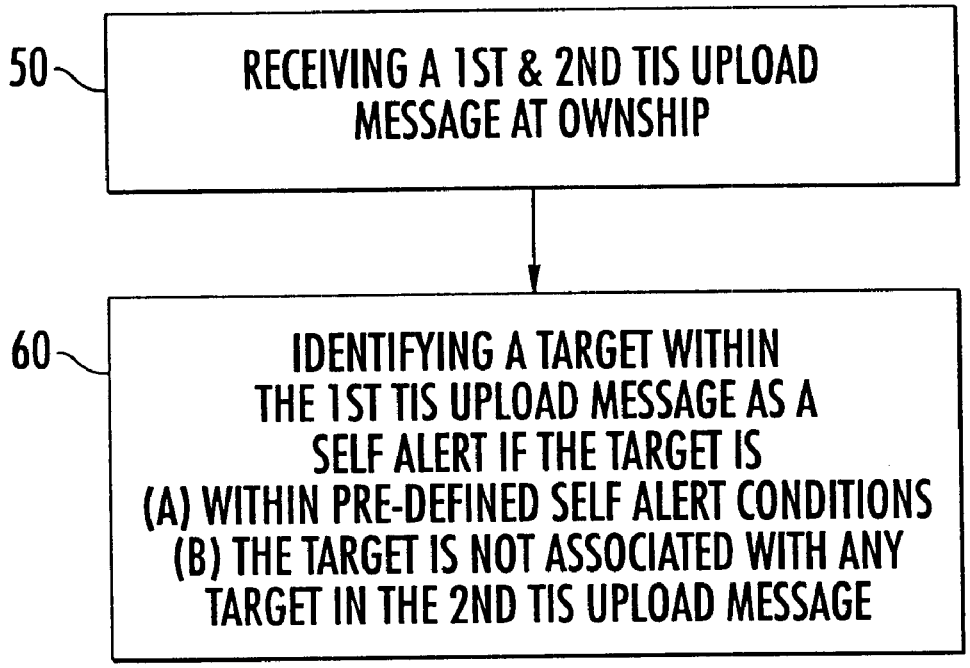
FIG. 2 is a flow diagram for detecting self-alerts in an upload message in a TIS system, in accordance with an embodiment of the present invention.

FIG. 2 is a flow diagram of a method for detecting self-alerts in upload messages in a TIS system, in accordance with an embodiment of the present invention. Initially, at step 50, an ownship receives a first and second TIS upload message. The TIS upload message comprises TIS information for targets within a coverage area of ownship. Once the TIS upload messages are received then, at step 60, a process is undertaken to identify one or more targets in the first TIS message as self-alerts if the target is (a) within pre-defined self-alert conditions of ownship and (b) the target is not associated with any target in the second TIS message.

The target TIS information found in the TIS upload message will include report parameters, such as traffic bearing, range, traffic track, relative altitude, altitude rate and the like. Identifying a target as a self-alert in accordance with an embodiment of the present invention, entails calculating a weighted sum of differences in corresponding report parameters between a target in the first TIS message and each target in the second TIS message. Once this calculation is made, then a determination is made as to whether the target in the first TIS message can be associated with any of the targets of the second TIS message based upon comparing the weighted sum of differences to a pre-defined threshold. In one embodiment of the invention, the traffic range and traffic track report parameters are weighted greater than the relative altitude and altitude rate report parameters.

Figure 3:
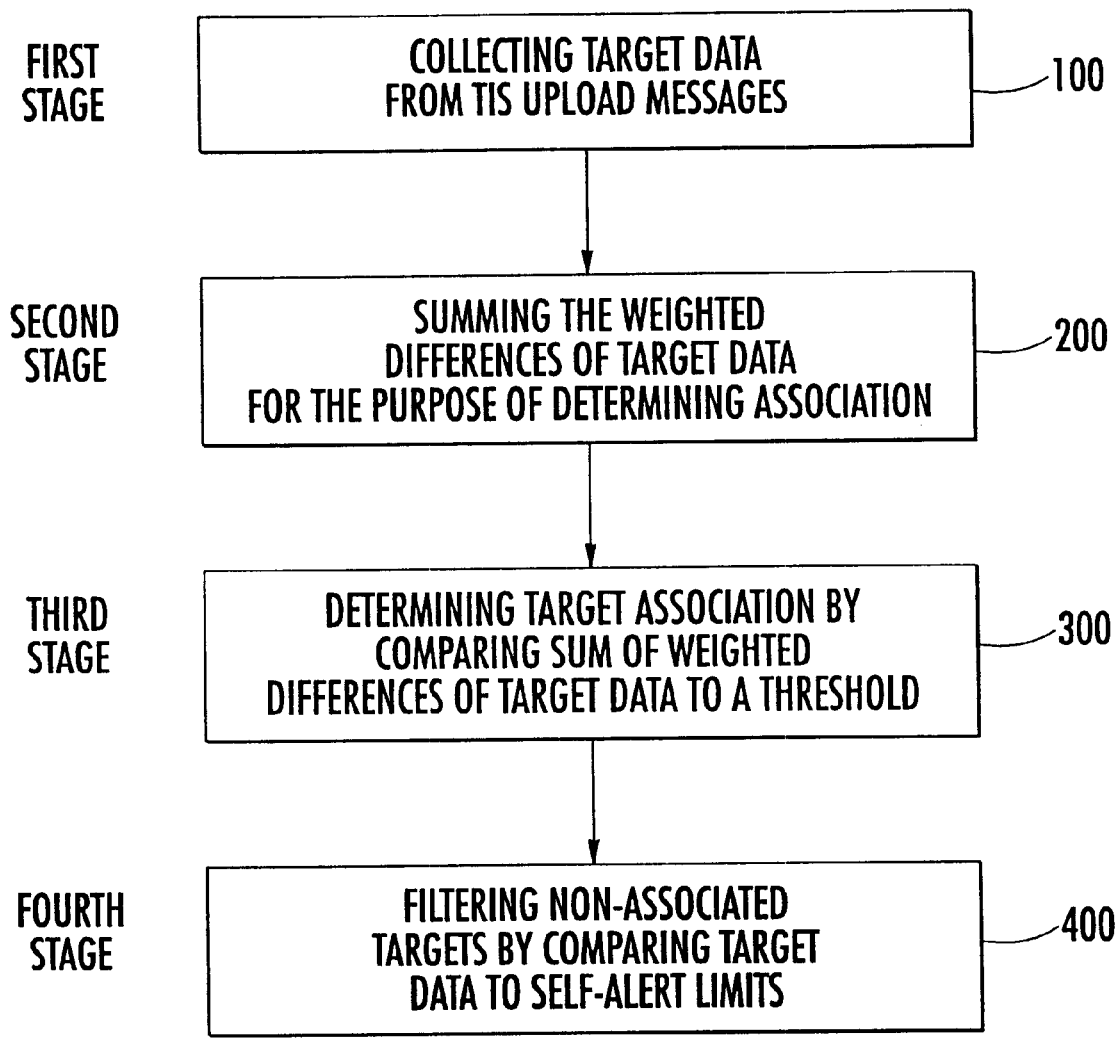
FIG. 3 is a flow diagram of the stages for detecting self-alerts in an upload message in a TIS system, in accordance with an embodiment of the present invention.

FIG. 3 is a flow diagram of the four stages within the association algorithm for detecting TIS self-alerts, in accordance with an embodiment of the present invention. The first stage 100 of the process involves collecting data from the TIS upload message. The second stage 200 of the algorithm involves performing the association calculation. The third stage 300 of the algorithm involves the association process to determine if the minimum association values exceed a threshold limit value. The fourth stage 400 involves the filtering process to determine if the current TIS message is a self alert and, therefore warrants filtering so as to exclude the TIS self-alert from the CDTI display.

As previously discussed, the typical TIS message will include fields within the traffic block corresponding to (1) traffic bearing, (2) range, (3) relative altitude, (4) altitude rate, and (5) track. In one embodiment of the invention these fields are collected from the current TIS message at stage 100, and are used to determine whether a TIS self-alert exists based upon subsequent association calculations. It should be noted that a TIS message may comprise additional fields, and it is conceivable and within the inventive concepts herein disclosed that any additional fields may be used in the subsequent association calculation (i.e., the weighting stage) if so warranted. For the purposes of comprehending further discussion, data from the current TIS upload message is referenced with subscript i and information from the previous TIS upload message is referenced with subscript j. Additionally, traffic bearing is denoted as BR, range is denoted as RG, relative altitude is denoted as RA, altitude rate is denoted as AR and track is denoted as TK.

Figure 4:
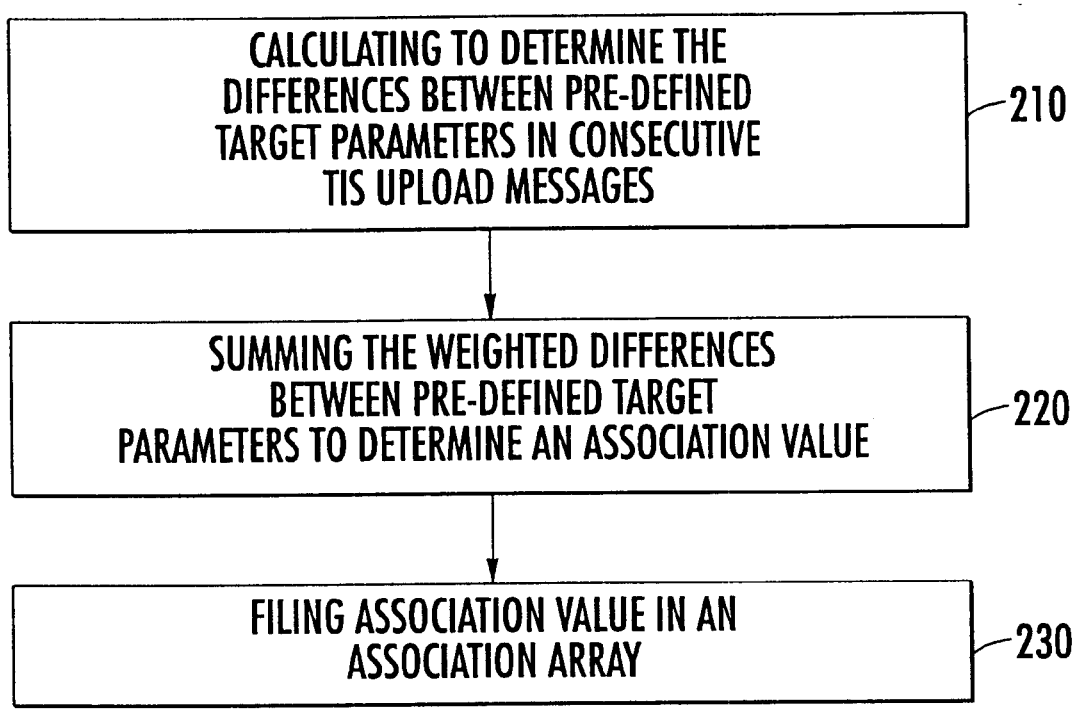
FIG. 4 is a flow diagram of the second stage (determining an association value) of the process illustrated in FIG. 3 for detecting self-alerts in an upload message in a TIS system, in accordance with an embodiment of the present invention.

At stage 200, the second stage of the algorithm involves performing the association calculation. FIG. 4 is flow diagram of an illustrative process for determining a weighted sum of the changes between the predetermined TIS message fields in consecutive TIS messages. In one embodiment of the invention the pre-determined TIS message fields comprise (1) traffic bearing, (2) range, (3) relative altitude, (4) altitude rate, and (5) track. At step 210, calculations are made to determine the quantifiable differences between pre-determined TIS message fields in consecutive TIS messages. In one embodiment of the invention, these calculations would appear as follows:

$$\Delta BR_{ij} = |BR_i - BR_j|$$

$$\Delta RG_{ij} = |RG_i - RG_j|$$

$$\Delta RA_{ij} = |RA_i - RA_j|$$

$$\Delta AR_{ij} = |AR_i - AR_j|$$

$$\Delta TK_{ij} = |TK_i - TK_j|$$

At step 220, calculations are made to determine the association value for consecutive TIS messages. The association value is determined by summing all the products of the individual TIS message field differences (calculated at step 210) with a predetermined assigned weight. In one embodiment of the invention, this summing calculation would appear as follows:

$$\Delta_{ij} = \Delta BR_{ij} \times W_{BR} + \Delta RG_{ij} \times W_{RG} + \Delta RA_{ij} \times W_{RA} + \Delta AR_{ij} \times W_{AR} + \Delta TK_{ij} \times W_{TK},$$

where W equals the predetermined assigned weight for the corresponding traffic bearing (BR), range (RG), relative altitude (RA), altitude rate (RA) and track (TK).

In one embodiment of the invention, an empirical determination has been made, based on flight testing, that for real TIS targets (as opposed to TIS self-alerts) changes between traffic range (RG) and traffic track (TK) in consecutive TIS messages are more stable than the changes in relative altitude (RA) and altitude rate (AR). Thus, a weight applied to the delta traffic range ($\Delta$RG) and the delta traffic track ($\Delta$TK) is different (in a disclosed embodiment, higher) than the weight applied to the delta relative altitude ($\Delta$RA) and delta altitude rate ($\Delta$AR). In a disclosed embodiment, the delta traffic range and delta track are weighted by a factor of 0.1, while the delta relative altitude and delta altitude rate are weighted by a factor of 0.07. Additionally, an empirical determination has been made, based on flight testing, that the delta traffic bearing ($\Delta$BR) is relatively inconsequential in determining TIS self-alerts and, therefore, in one embodiment of the invention, the delta traffic bearing is weighted by a factor of 0.0. It should be noted that for the purpose of the disclosed invention the weighting factors shown are by way of example only. Other weighting factors may be pre-defined, empirically or otherwise determined, and are within the inventive concepts herein disclosed.

At step 230, once the association value has been calculated, the association value is then filed in an association array (AA) defined by I×J elements with each element corresponding to an association value.

Figure 5:
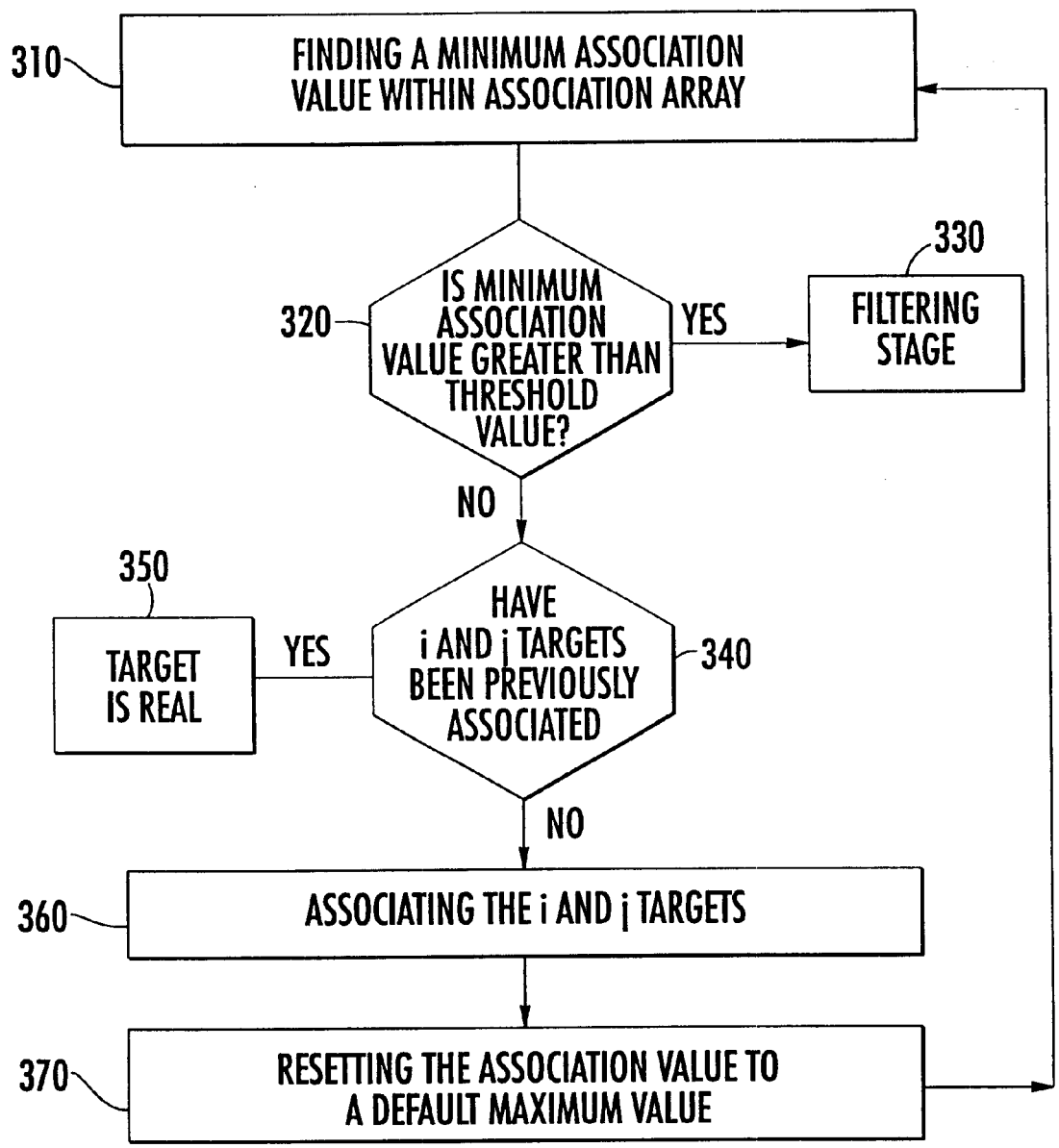
FIG. 5 is a flow diagram of the third stage (determining target association) of the process illustrated in FIG. 3 for detecting self-alerts in an upload message in a TIS system, in accordance with an embodiment of the present invention.

Referring to FIG. 3, at stage 300, the third stage of the algorithm involves performing the association process to determine if the minimum association values exceed a threshold limit value. FIG. 5 is flow diagram of an illustrative process for determining if the minimum value within the association array exceeds the predetermined threshold limit value. At step 310, a minimum association value is found within the association array and, at step 320, a determination is made as to whether this minimum association value is greater than the predetermined threshold limit value. In a preferred embodiment of the invention the threshold limit for the association algorithm has been empirically determined, based on flight-testing, to be 0.74. It should be noted that for the purpose of the disclosed invention the threshold limit shown is by way of example only. Other threshold limits may be pre-defined, empirically or otherwise determined, and are within the inventive concepts herein disclosed.

If the minimum association value in the association array is determined to be greater than the threshold limit then, at step 330, the fourth stage 400 (FIG. 1), the filtering stage of the association algorithm ensues. If the minimum association value in the association array is determined to be less than the threshold limit then, at step 340, a determination is made as to whether the target in the current TIS message (i) and the target in the previous TIS message (j) have been previously associated (i.e., determined to be the same target). If it is determined that the current and previous TIS messages have been associated then, at step 350, the current TIS target is defined as real and is displayed on the CDTI display. If it is determined that the current and previous TIS messages have not been associated then, at step 360, the current and previous TIS messages are associated, the current TIS target is defined as real and is displayed on the CDTI display. At step 370, the value of the association with the minimum value is reset within the association array to a predefined default maximum value that is greater than the threshold limit value. This reset process ensues so that the association value is not considered again for iterative association process. After the reset process has completed, the process returns to step 310 and a new minimum association value is found in the association array.

Figure 6:
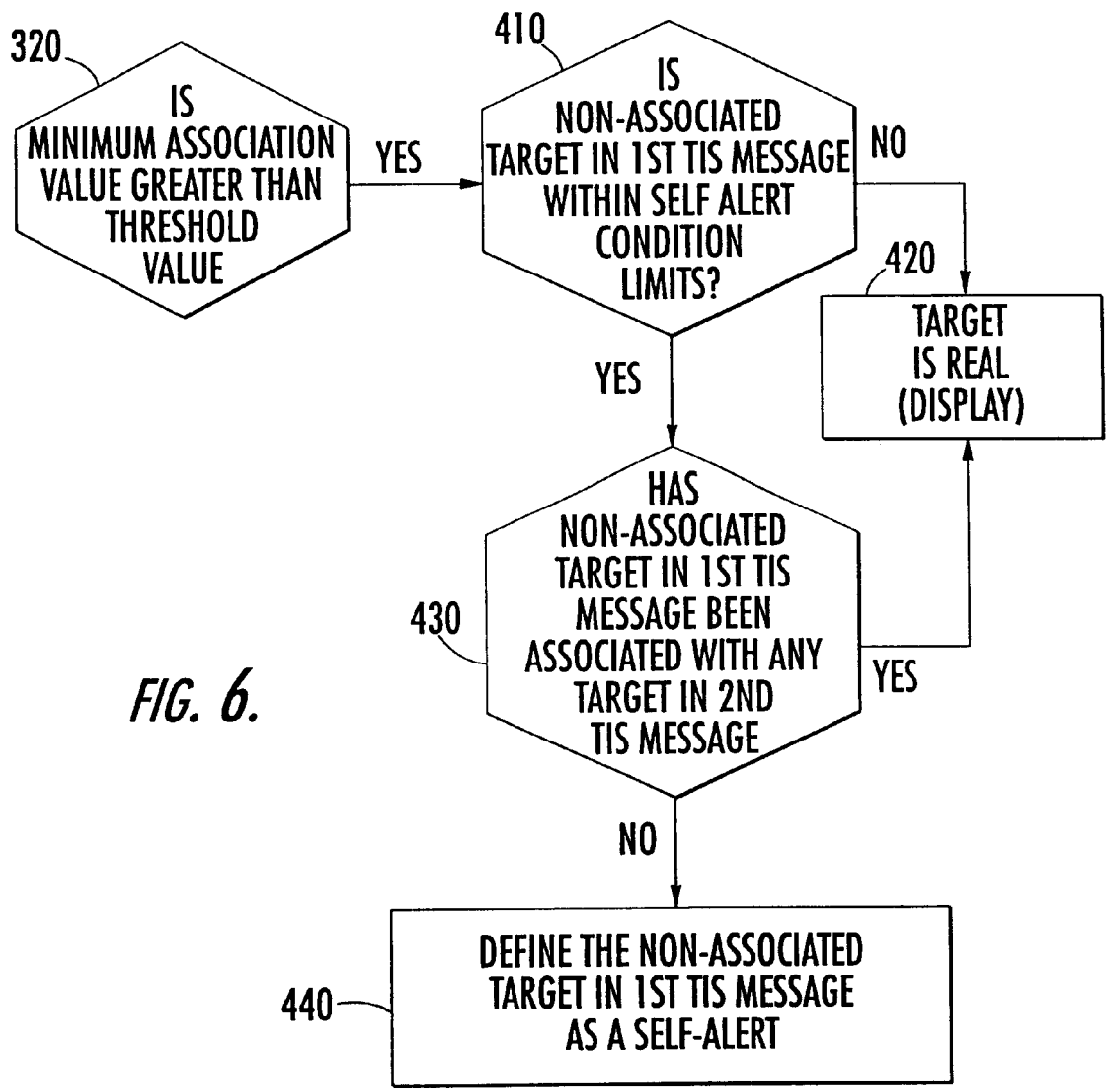
FIG. 6 is a flow diagram, of the fourth stage (filtering to determine self-alerts) of the process illustrated in FIG. 3 for detecting self-alerts in an upload message in a TIS system, in accordance with an embodiment of the present invention.

Referring to FIG. 3, at stage 400 the fourth stage of the association algorithm involves the filtering process to determine if the current TIS message is a self alert and, therefore warrants filtering so as to exclude the TIS self-alert from the CDTI display. FIG. 6 is a flow diagram illustrating the process involved in determine if the current TIS message should be declared a TIS self alert and, thereby, filtered for CDTI display exclusion. As previously discussed, at step 320 (FIG. 5), if a determination is made that the minimum association value is greater than the threshold limit value then the filtering stage ensues. At step 410, a determination is made to determine whether each target in the current TIS message is within the pre-defined self-alert conditions. As previously discussed the self-alert conditions will typically be defined in accordance with traffic range and relative altitude, although any other pre-defined self-alert conditions are possible. In one embodiment of the invention the traffic range self-alert condition will be less than about 0.125 to about 2.0 nm, preferably about 0.875 nm, and the relative altitude self alert conditions will be less than about 200 feet to about 1000 feet, preferably about 500 feet. If the determination is made that the self-alert conditions are not met (i.e., the range or altitude are greater than the pre-defined limits) for a target then, at step 420, that target is determined to be a real target and is displayed on the CDTI. If the determination is made that the self-alert conditions have been met then, at step 430, a determination is made as to whether that target in the current TIS message has been associated with any target in the previous TIS target. If the determination is made that the target in the current TIS message has been previously associated with a target in the previous TIS message then, at step 420, that target is determined to be a real target and is displayed on the CDTI. If the determination is made that the target of the current TIS message has not been previously associated with a target in the previous TIS message then, at step 440, the non-associated target in the current TIS message is defined as a self-alert and eliminated from subsequent CDTI images.

Thus, the present invention provides for improved systems and methods for detecting self-alerts from upload messages in a TIS system to thereby eliminate the likelihood of such self-alerts appearing on CDTI displays. Thus, the present invention provides an improved visual display system for pilots and air traffic controllers. The invention also provides a more accurate visual display for pilots and air traffic controllers tracking actual targets in the vicinity of an airborne aircraft.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method for detecting self-alerts in upload messages in a TIS system, the method comprising:

receiving, at ownship, first and second TIS upload messages, each message comprising TIS information for targets proximate the ownship; and identifying a target in the first TIS message as a self-alert if the target is within pre-defined self-alert conditions of ownship and the target is not associated with any target in the second TIS message.

2. The method of claim 1 wherein the TIS information includes report parameters, and wherein identifying a target further comprises determining a weighted sum of differences in corresponding report parameters between a target in the first TIS message and each target in the second TIS message and determining if the target in the first TIS message is associated with any of the targets of the second TIS message based upon the weighted sum of differences as compared to a threshold.

3. The method of claim 1, wherein the TIS information includes bearing, range, track, relative altitude and altitude rate parameters, and wherein identifying a target further comprises determining a weighted sum of differences in corresponding bearing, range, track, relative altitude and altitude rate parameters between a target in the first TIS message and each target in the second TIS message and determining if the target in the first TIS message can be associated with any of the targets of the second TIS message based upon the weighted sum of differences as compared to a threshold.

4. The method of claim 3, wherein determining a weighted sum of differences in corresponding bearing, range, track, relative altitude and altitude rate parameters further comprises weighting the range and track parameters to a different degree than the relative altitude and altitude rate parameters, thereby emphasizing the range and track parameters over the relative altitude and altitude rate parameters.

5. A method for detecting self alerts in upload messages in a TIS system, the method comprising:

receiving, at ownship, first and second TIS upload messages, each message comprising TIS information for targets proximate the ownship;

collecting pre-defined TIS information for each target in the first and second TIS upload messages for the purpose of detecting self-alerts;

determining differences as compared between the pre-defined TIS information for each target in the first TIS upload message to each target in the second TIS upload messages;

applying pre-defined weights to the differences of each comparison;

summing the weighted differences of each comparison; and filtering a target if the summed weighted differences exceeds a predefined threshold.

6. The method of claim 5, wherein collecting pre-defined TIS information for each target in the first and second TIS upload messages further comprises collecting from each target in the first and second TIS upload messages at least one TIS field from the group consisting of traffic bearing, range, relative altitude, altitude rate, and track.

7. The method of claim 5, wherein collecting pre-defined TIS information for each target in the first and second TIS upload messages further comprises collecting TIS information related to at least traffic bearing, range, relative altitude, altitude rate, and track from the first and second TIS upload message.

8. The method of claim 7, wherein applying pre-defined weights to the differences further comprises applying a weight to range and track TIS information that is different from that applied to relative altitude and altitude rate TIS information.

9. The method of claim 5, wherein applying pre-defined weights to the differences further comprises applying a pre-determined weight based on empirical data to the differences between the pre-defined TIS information for each target in the first and second TIS upload messages.

10. The method of claim 5, wherein filtering a target further comprises comparing the summed weighted differences to a pre-defined maximum threshold level based on empirical data to assess whether each of the targets of the first and second TIS upload messages are associated.

11. The method of claim 5, wherein filtering a target in the second TIS upload message if the comparison results in the summed weighted differences exceeding the predefined threshold further comprises filtering a target by comparing the range for the target in the second TIS upload message to a maximum limit for range.

12. The method of claim 5, wherein filtering a target in the second TIS upload message if the comparison results in the summed weighted differences exceeding the predefined threshold further comprises filtering by comparing the relative altitude for the target in the second TIS upload message to a maximum limit for relative altitude.

13. The method of claim 5, wherein filtering a target the second TIS upload message if the comparison results in the summed weighted differences exceeding the predefined threshold further comprises filtering by comparing the range and relative altitude for the target in the second TIS message to maximum limits for range and relative altitude.

14. The method of claim 13 wherein the TIS information includes report parameters, and wherein identifying a target further comprises determining a weighted sum of differences in corresponding report parameters between a target in the first TIS message and each target in the second TIS message and determining if the target in the first TIS message is associated with any of the targets of the second TIS message based upon the weighted sum of differences as compared to a threshold.

15. A method for detecting and removing self-alerts in a TIS system, the method comprising:
 receiving, at ownship, a first and second TIS upload message, each message comprising TIS information for targets proximate the ownship;
 identifying a target in the first TIS message as a self-alert if the target is within pre-defined self-alert conditions of ownship and the target is not associated with any target in the second TIS message; and
 removing the target in the first TIS message from a subsequent view of a CDTI display.

16. The method of claim 15, wherein the TIS information includes bearing, range, track, relative altitude and altitude rate parameters, and wherein identifying a target further comprises determining a weighted sum of differences in corresponding range, track, relative altitude and altitude rate parameters between a target in the first TIS message and each target in the second TIS message and determining if the target in the first TIS message is associated with any of the targets of the second TIS message based upon the weighted sum of differences as compared to a threshold.

17. The method of claim 16, wherein determining a weighted sum of differences in corresponding bearing, range, track, relative altitude and altitude rate parameters further comprises weighting the range and track parameters to a different degree than the relative altitude and altitude rate parameters, thereby emphasizing the range and track parameters over the relative altitude and altitude rate parameters.

18. A computer program product for detecting self alerts in upload messages in a TIS system, comprising:
 a computer usable medium having computer readable program code means embodied in the medium for causing detection of self alerts in upload messages in a TIS system, the computer readable program code including:
  computer readable program code for causing said computer to receive a first and second TIS upload message, each message comprising TIS information for targets proximate an ownship; and
  computer readable program code for causing said computer to identify a target in the first TIS message as a self-alert if the target is within pre-defined self-alert conditions of ownship and the target is not associated with any target in the second TIS message.

19. The computer program product of claim 18, wherein the TIS information includes report parameters, and wherein the computer readable program code for causing said computer to identify a target further comprises computer readable program code for causing said computer to determine a weighted sum of differences in corresponding report parameters between a target in the first TIS message and each target in the second TIS message and computer readable program code for causing said computer to determine if the target in the first TIS message is associated with any of the targets of the second TIS message based upon the weighted sum of differences as compared to a threshold.

20. The computer program product of claim 19, wherein the TIS information includes bearing, traffic range, traffic track, relative altitude and altitude rate parameters, and wherein the computer readable program code for causing said computer to identify a target further comprises computer readable program code for causing said computer to determine a weighted sum of differences in corresponding bearing, range, track, relative altitude and altitude rate parameters between a target in the first TIS message and each target in the second TIS message and computer readable program code for causing said computer to determine if the target in the first TIS message is associated with any of the targets of the second TIS message based upon the weighted sum of differences as compared to a threshold.

21. The computer program product of claim 20, wherein the computer readable program code for causing said computer to determine a weighted sum of differences in corresponding bearing, range, track, relative altitude and altitude rate parameters further comprises computer readable program code for causing said computer to weigh the range and track parameters to a greater degree than the relative altitude and altitude rate parameters.

22. A program storage device readable by a machine, tangibly embodying a program of instructions executable by the machine to perform a method for detecting self alerts in upload messages in a TIS system, the method comprising:
 receiving first and second TIS upload messages, each message comprising TIS information for targets proximate an ownship;
 collecting pre-defined TIS information for each target in the first and second TIS upload messages for the purpose of detecting self-alerts;
 determining differences between the pre-defined TIS information for each target in the first and second TIS upload messages;

applying a pre-defined weight to the differences between the pre-defined TIS information for each target in the first and second TIS upload messages;

summing the weighted differences of the pre-defined TIS information for each target in the first and second TIS upload messages;

comparing the summed weighted differences to a pre-defined maximum threshold level to assess whether each of the targets in the first and second TIS upload messages are associated; and filtering a target in the second TIS upload message if the comparison results in the summed weighted differences exceeding the predefined threshold.

23. The program storage device of claim 22, wherein collecting pre-defined TIS information for each target in the first and second TIS upload messages further comprises collecting from each target in the first and second TIS upload messages at least one TIS field from the group consisting of bearing, range, relative altitude, altitude rate, and traffic track.

24. The program storage device of claim 22, wherein collecting pre-defined TIS information for each target in the first and second TIS upload messages further comprises collecting TIS information related to traffic bearing, range, relative altitude, altitude rate, and track from the first and second TIS upload message.

25. The program storage device of claim 22, wherein applying a pre-defined weight to the differences between the pre-defined TIS information for each target in the first and second TIS upload messages further comprises applying a pre-determined weight based on empirical flight-test data to the differences between the pre-defined TIS information for each target in the first and second TIS upload messages.

26. The program storage device of claim 22, wherein applying a pre-defined weight to the differences between the pre-defined TIS information for each target in the first and second TIS upload messages further comprises applying greater weight to range and track TIS information and less weight to relative altitude and altitude rate TIS information.

27. The program storage device of claim 22, wherein comparing the summed weighted differences to a pre-defined maximum threshold level to assess whether each of the targets of the first and second TIS upload messages are associated further comprises comparing the summed weighted differences to a pre-defined maximum threshold level based on empirical flight-test data to assess whether each of the targets of the first and second TIS upload messages are associated.

28. The program storage device of claim 22 wherein filtering a target in the second TIS upload message if the comparison results in the summed weighted differences exceeding the predefined threshold further comprises filtering a target by comparing the range for the target in the second TIS upload message to a maximum limit for range.

29. The program storage device of claim 22, wherein filtering the second TIS upload message if the comparison results in the summed weighted differences exceeding the predefined threshold further comprises filtering by comparing the relative altitude for the target in the second TIS upload message to a maximum limit for relative altitude.

30. The program storage device of claim 22, wherein filtering the second TIS upload message if the comparison results in the summed weighted differences exceeding the predefined threshold further comprises filtering by comparing the range and relative altitude for the target in the second TIS message to maximum limits for range and relative altitude.

* * * * *